Figure 3:
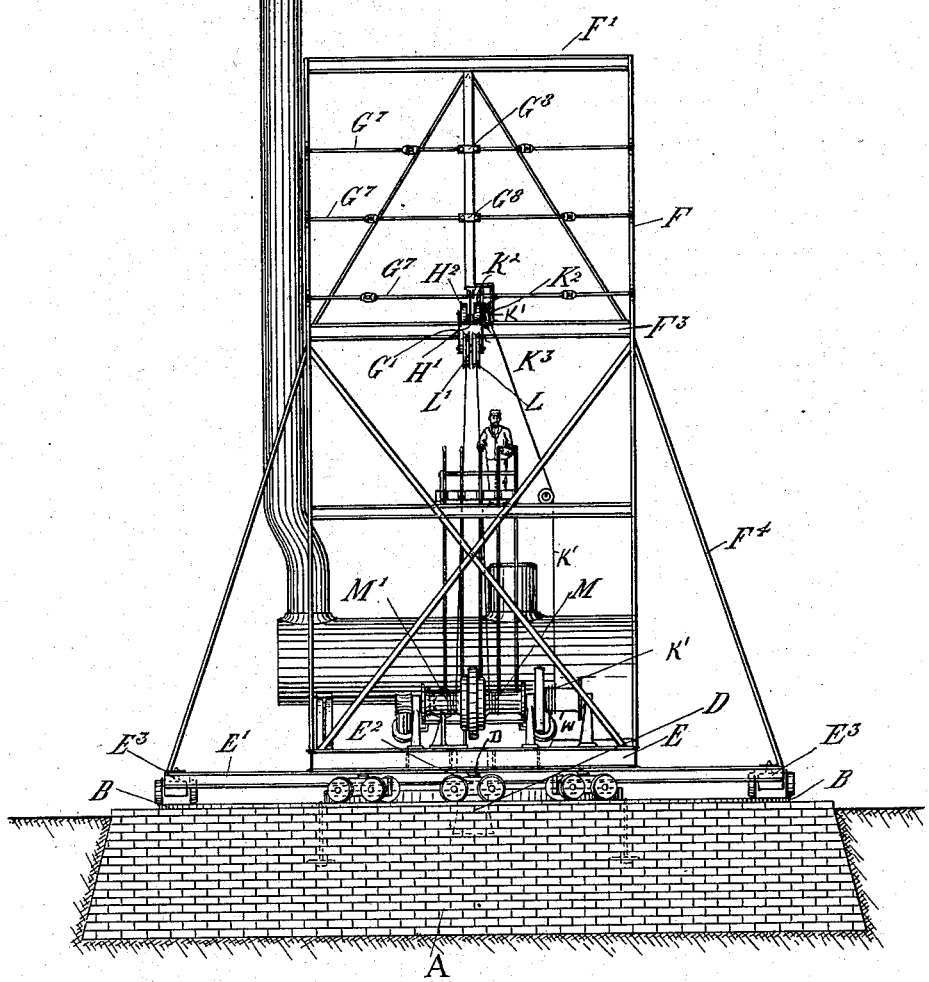

No. 654,739. Patented July 31, 1900.
J. H. LANCASTER.
HOISTING AND CONVEYING APPARATUS.
(Application filed June 28, 1897.)
(No Model.) 6 Sheets—Sheet 1.
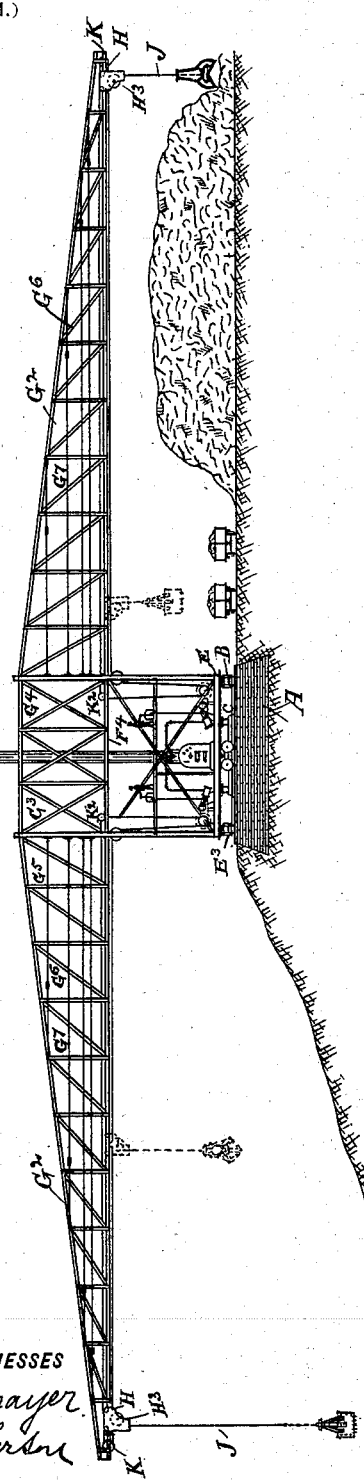
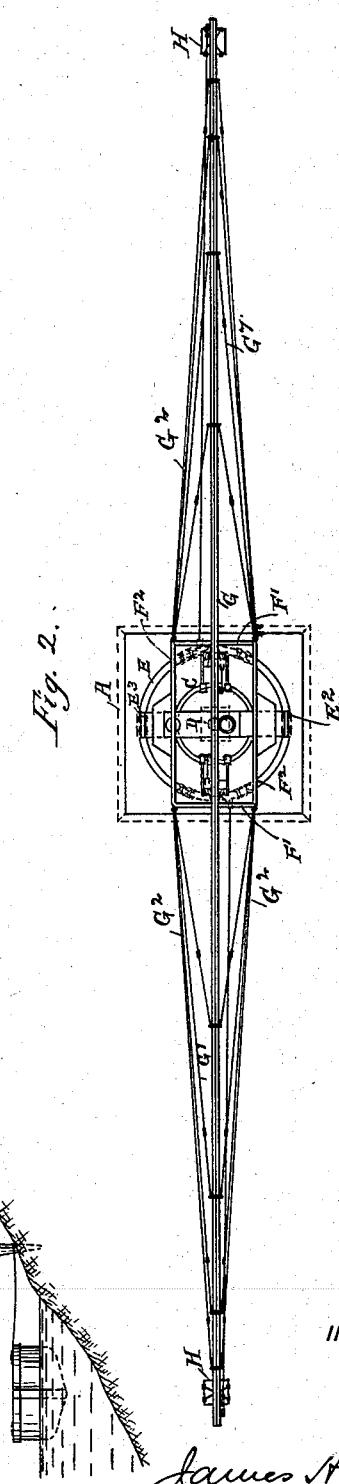
WITNESSES
N. Newmayer
P. McPherson
INVENTOR:
James H. Lancaster

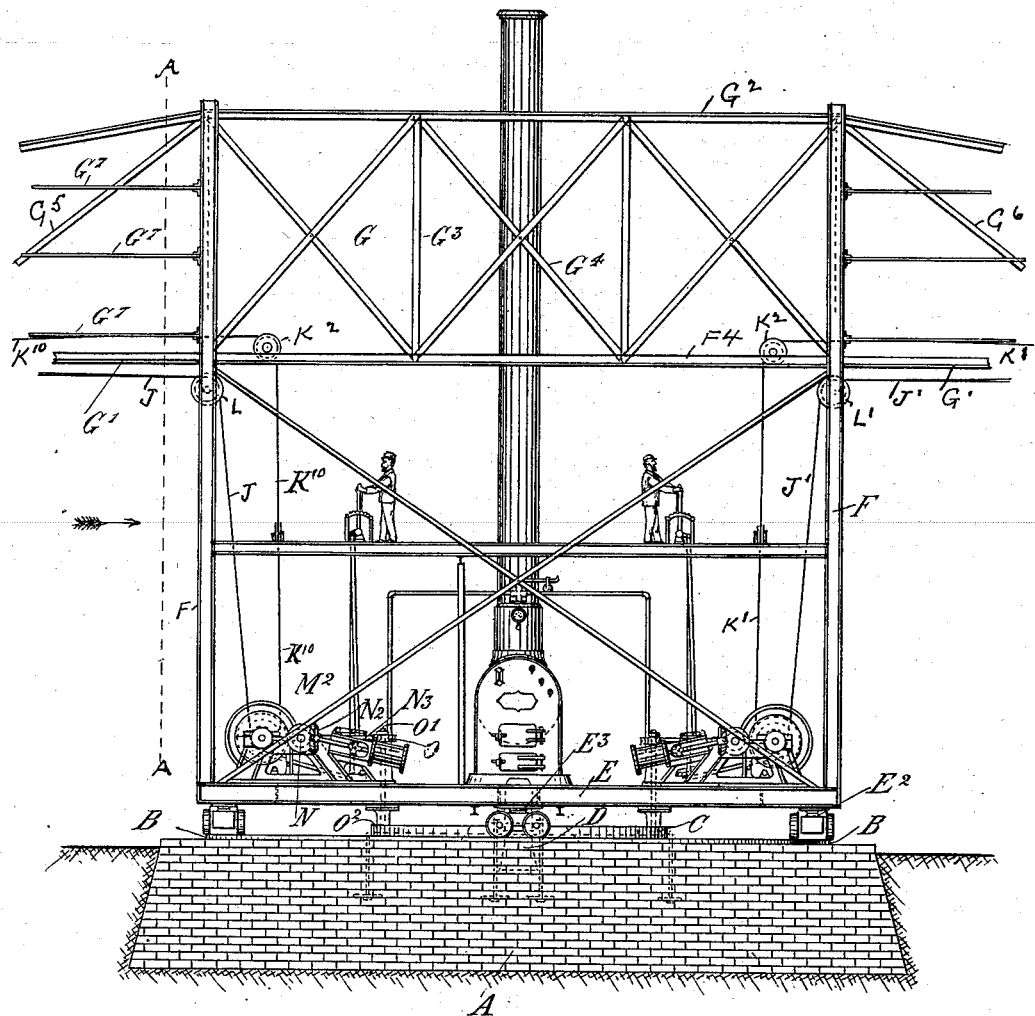

No. 654,739. Patented July 31, 1900.
J. H. LANCASTER.
HOISTING AND CONVEYING APPARATUS.
(Application filed June 28, 1897.)
(No Model.) 6 Sheets—Sheet 3.
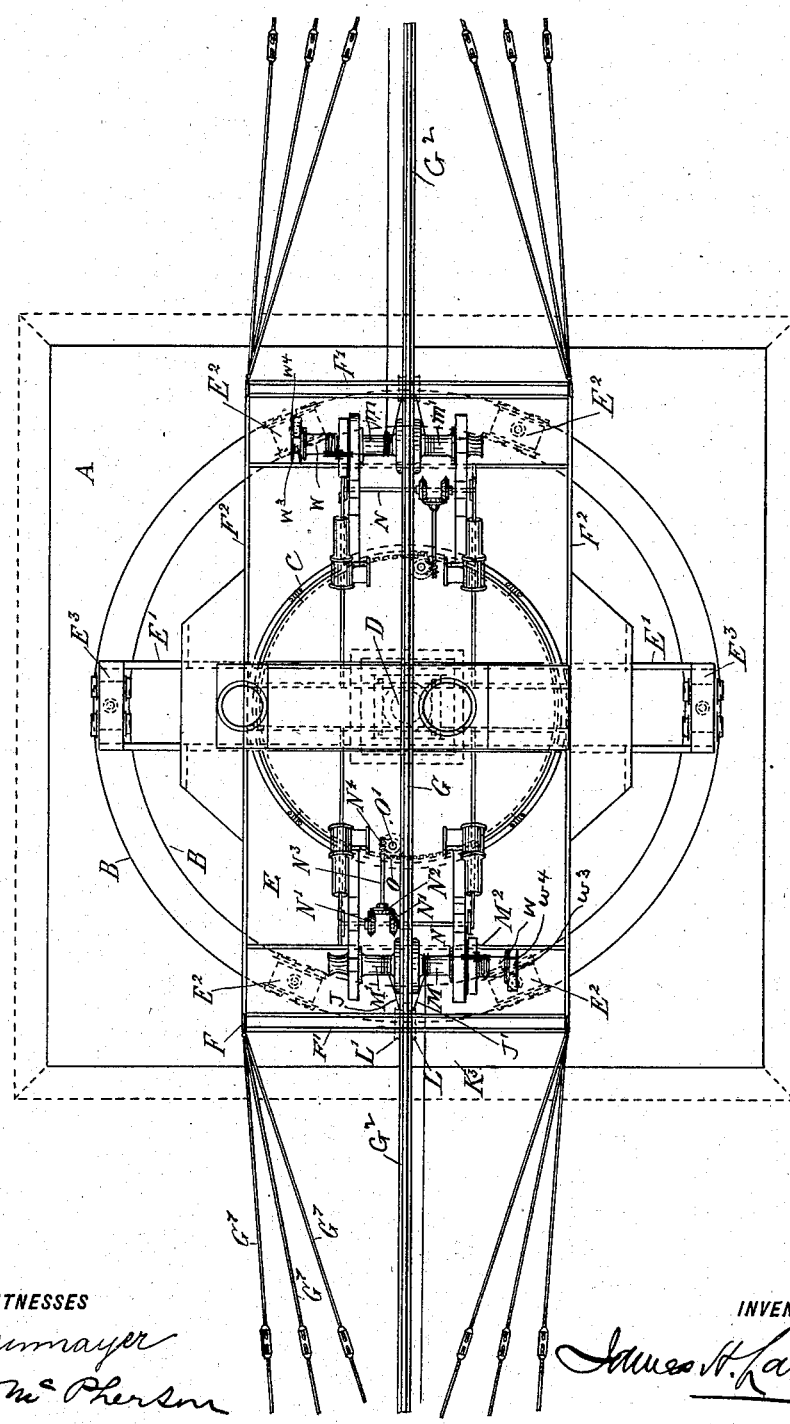

No. 654,739. Patented July 31, 1900.
J. H. LANCASTER.
HOISTING AND CONVEYING APPARATUS.
(Application filed June 28, 1897.)
(No Model.) 6 Sheets—Sheet 4.

WITNESSES
M. Neumayer
R. H. McPherson

INVENTOR
James H. Lancaster

No. 654,739. Patented July 31, 1900.
J. H. LANCASTER.
HOISTING AND CONVEYING APPARATUS.
(Application filed June 28, 1897.)

(No Model.) 6 Sheets—Sheet 5.

WITNESSES
M. Nemmayer
R H McPherson

INVENTOR
James H. Lancaster

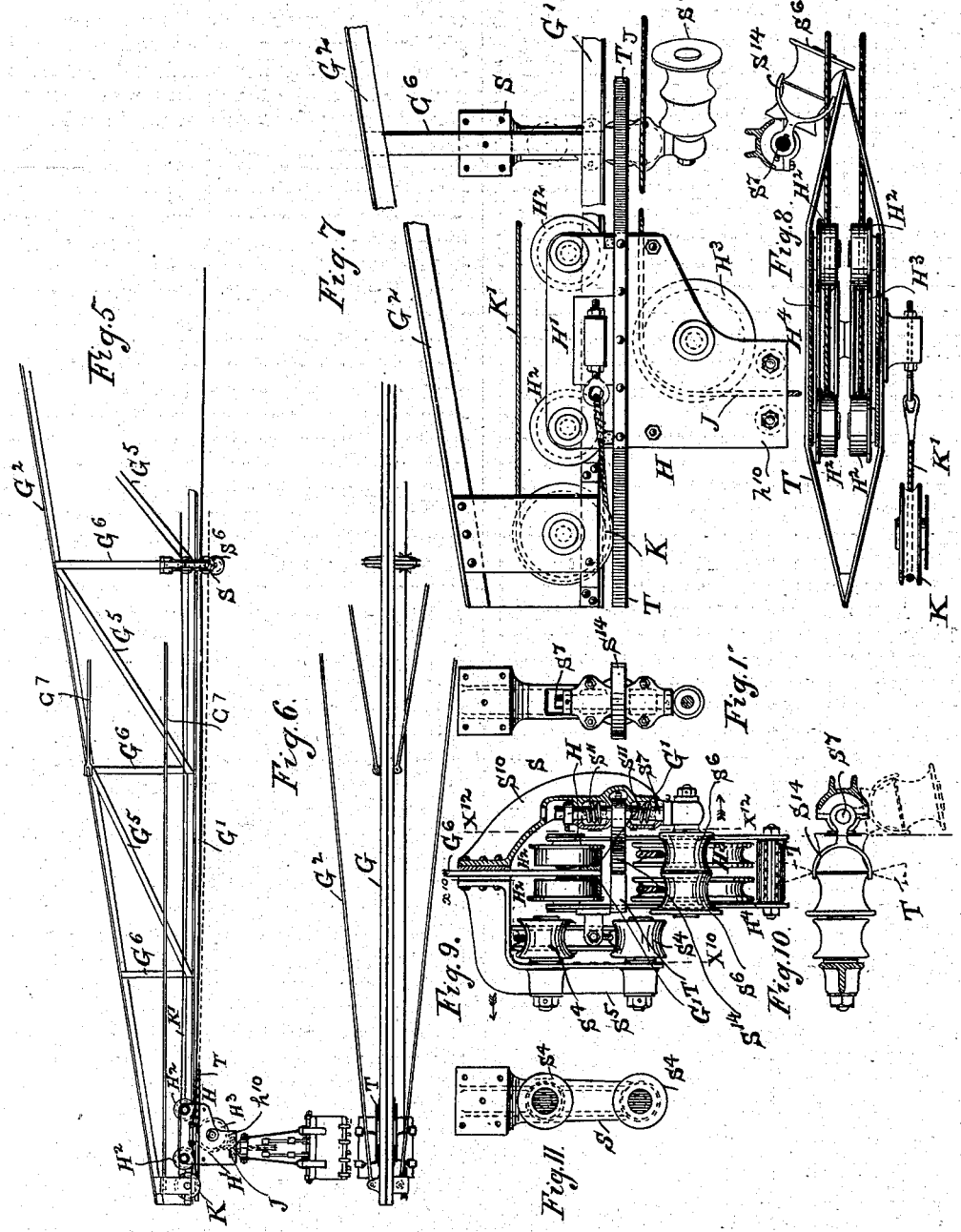

UNITED STATES PATENT OFFICE.

JAMES H. LANCASTER, OF NEW YORK, N. Y.

HOISTING AND CONVEYING APPARATUS.

SPECIFICATION forming part of Letters Patent No. 654,739, dated July 31, 1900.

Application filed June 28, 1897. Serial No. 642,777. (No model.)

*To all whom it may concern:*

Be it known that I, JAMES H. LANCASTER, a citizen of the United States, and a resident of New York, in the county of New York and State of New York, have invented a certain new and useful Cantaliver and Hoisting and Conveying Apparatus, of which the following is a specification.

The present invention relates to hoisting and conveying apparatus, and has reference more particularly to that class of constructions wherein a cantaliver or truss frame of comparatively-extended length is supported by a central turn-table structure and constitutes oppositely-extended trackways along which one or more load-carriages move and are controlled by mechanism located in said turn-table structure, the carriage or carriages having a double-chain grapple, bucket, skip, or similar apparatus operated therefrom.

An important feature connected with the present invention consists in the duplex provision whereby as the cantaliver frame or boom is swung the grapples or buckets on the respective arms thereof may simultaneously therewith and with each other be propelled, filled, and discharged at any point between the central structure and the extremity of said arms, the cantaliver frame or structure being practically balanced by the apparatus on the respective arms.

Another important feature of my invention is the fall-rope carriers and a plow or spreader secured to each end of the load-carriage, whereby the movable sheaves of the fall-rope carriers are readily and conveniently pushed or thrust aside and automatically returned into position to permit the load-carriage to travel to and fro on the trolley-way frame or boom of the cantaliver.

The simplicity of the general arrangement is such that the cantaliver boom or frame need only be swung one-half circle to permit the discharge of the apparatus operating on one arm or boom while the second apparatus is loading or traveling on the other.

The improved hoisting and conveying apparatus may be mounted and operated on a stationary base, as shown, or upon trucks running on suitable rails or upon scows or floats to afford ready transportation while in use.

Many other important features and details are connected with the invention and are more clearly set forth hereinafter.

Figure 4:
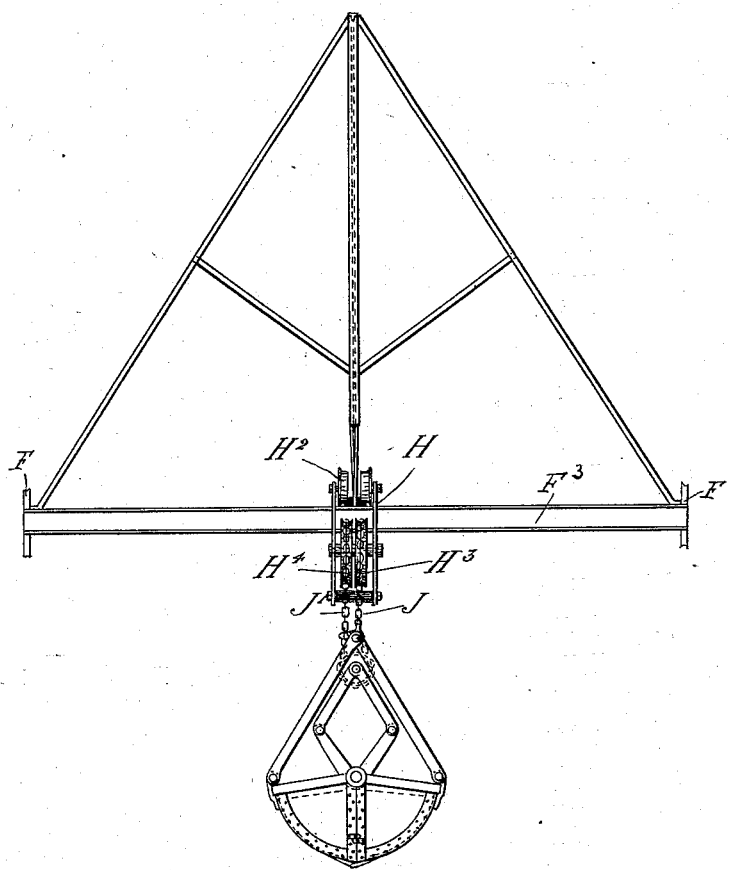

In the accompanying drawings, forming part of this specification, Figure 1 is a view showing in side elevation a hoisting and conveying apparatus embodying my improvements. Fig. 1$^a$ is a view corresponding to Fig. 1, but showing on a larger scale the turn-table and central part of the structure. Fig. 2 is a plan view of the apparatus shown in Fig. 1. Fig. 2$^a$ is a plan view of the apparatus shown in Fig. 1$^a$. Fig. 3 is an end view of the said apparatus, the view being taken in the plane indicated by the dotted lines A A, Fig. 1$^a$, and looking in the direction of the arrow in said figure. Fig. 4 is a similar view looking in a direction opposite to said arrow. Fig. 5 is a side view of a portion of the boom, showing the fall-rope carrier attached and the load-carriage with plow secured to said carriage. Fig. 6 is a top view of same. Fig. 7 is an enlarged side view of the load-carriage with plow attached acting upon the movable sheaves of the fall-rope carrier. Fig. 8 is a plan view of Fig. 7. Fig. 9 is an enlarged end view, partly in section, of the fall-rope carrier, showing the load-carriage approaching the same for the purpose of pushing aside the movable sheaves of the said carrier; Fig. 10, a plan view of the movable sheaves of the carrier, dotted lines showing end of plow and position of said sheaves when pushed aside by said plow; Fig. 11, a sectional view on line $X^{10} X^{10}$, Fig. 9, looking in direction of arrow. Fig. 12 is a sectional view on line $X^{12} X^{12}$, Fig. 9, looking in direction of arrow with the upper frame part in elevation.

Similar reference characters refer to corresponding parts throughout the specification.

Prominently the improved apparatus comprises a central vertically-revoluble structure supporting an upper cantaliver truss-frame presenting oppositely-extending arms or trackways and a load carriage or carriages movable along said arms and suspending a grapple, bucket, or similar apparatus. It is, however, obvious that any kind of load can be carried to and fro on this trackway and also that one side or end of the extended boom and trackway may be dispensed with and a weighted terminal at the shortened end be adopted for balancing it.

In the several figures of the drawings I have represented the central turn-table structure as being mounted on a permanent base and having two extended boom-frames which, as alluded to hereinafter, may be of any suitable portable character to provide for a change of position as the work progresses.

Referring again to the figures, A designates a foundation or bed of masonry, upon the upper side of which is secured an outer circular trackway B and an inner concentric gearing C. Centrally within the last-mentioned ring bears a pivot or gudgeon pin D, forming the turning center of the main platform of the central structure.

The platform E, as shown in Fig. 2$^a$, may be generally of rectangular form, with lateral extensions E' E' at right angles thereto. The respective ends of the platform E are supported upon one or more bogie-trucks E$^2$, the wheels of which travel on the circular trackway B B, the said trucks being swiveled to permit their free relative movement. The platform, through its extensions E', is further supported upon corresponding trucks E$^3$ beneath said extensions. A series of rollers may, however, be used instead of the swiveled bogies.

Rigidly upon the platform is a rectangular vertical frame, preferably constructed of iron and properly braced to secure strength, the four corner-uprights F of the same being connected at their tops by end cross-stays F' and side beams F$^2$, main truss-supports F$^3$ transversely connecting the uprights at a lower point, side braces F$^4$, anchoring in external extensions of the platform, being provided.

Mounted and secured on the main supports F$^3$ is a horizontal truss G, centrally located and preferably of single character, the lower part of which, as shown, is presented by a pair of longitudinal L-shaped metal or angle beams G', projecting for a considerable distance beyond each end of the main frame to form extended arms, booms, or trackways. The upper member G$^2$ of the truss G extends between and beyond each pair of cross-stays F', said bar G$^2$ being inclined beyond the ends of the main frame to and connected with the outer extremities of the angle-beams G'.

Between the uprights of the main frame the angle-beams G' and upper bar G$^2$ are relatively braced and connected by a series of vertical and cross stays G$^3$ G$^4$, the upper ends of which are secured to the bar G$^2$, while the lower parts are bolted between the angle-beams G'. The outer parts of the angle-beams and the inclined portions of the bar G$^2$ are correspondingly connected and braced by a series of vertical and also inclined stays G$^5$ G$^6$, the arm, boom, or trolley-way thus formed being rigidly held against lateral movement relatively to the uprights of main frame by a series of wire ropes or tie-rods G$^7$, located at each side and pivotally connected at their inner ends to the upright and at their outer ends to short cross-bars G$^8$, the rods G$^7$ being divided and connected by turnbuckles to effect the desired rigidity of connection.

As will be readily seen by reference to Figs. 1, 2, 3, and 5, the rods G$^7$ are connected at several points of each arm to uniformly brace the same throughout its entire length. The several braces therefore occupy relatively-different angles in respect to the boom or arm, as shown in Fig. 2$^a$.

It will be obvious that the character of the boom or cantaliver frame is such that it presents or forms a single construction of exceedingly-narrow width, yet possesses extreme lightness, rigidity, and strength, while at the same time providing an extended track or trolley-way.

The load carriage or carriages H H comprise side plates H', with depending guard extensions $h^{10}$, forming stops or buffers between which are journaled four flanged carrying-wheels H$^2$ H$^2$, which bear upon the horizontal flanges of the channel or L irons or beams. Between the lower parts of the plates H' H' a pair of sheaves H$^3$ H$^4$ are mounted, around the first of which passes the chain or cable J for suspending the bucket or grapple, and a second chain or cable J' passes around the sheave H$^4$ and controls the opening and closing movements of the bucket, grapple, or other device for grappling and handling material. In lieu of a grapple or bucket sheave an ordinary platform or skip may be suspended from the cable or chain J, the cable or chain J' being so secured as to effect the tilting and dumping movement of the platform.

At the extremity of each arm or boom is a guide-pulley K, around which passes the hauling rope or cable K', one end of which is attached to the forward part of the load-carriage H, as hereinafter described. The hauling-cable K' passes rearwardly along said arm or boom, is guided over pulley K$^2$, and from thence is deflected downward and attached to the bull-wheel or spool W forming part of the hoisting-machine proper. This cable draws the carriage forward. Another cable K$^{10}$, attached to the load-carriage and passing over pulleys K$^{12}$ to another bull-wheel of the hoisting-machine, is used to return the carriage to the central structure. I am aware that the same effect can be produced by a continuous cable and a single bull-wheel or drum, and in such case the opening and closing chains of the grapple or bucket draw the load-carriage inwardly toward the central structure, where tension is released from the aforesaid single drum or bull-wheel.

The cables J and J' of the bucket or grapple are also led rearward around pulleys L L', located in the upper part of the main structure and from which they descend to and are wound upon the drums M and M', respectively, of the hoisting-machine.

The extended arms or booms of the cantaliver are provided with the requisite number of fall-rope carriers S, secured to the vertical stays $G^6$ of the L-irons G', (see Fig. 9,) the number being governed by the length of the boom-arms. Each carrier comprises two fixed sheaves $S^4$, revolving on axles secured to the bracket-arms $S^5$, and also two movable sheaves $S^6$ on axles attached to turning shaft $S^7$, revolving in suitable bearings in bracket-arm $S^{10}$. Suitable tension-springs $S^{11}$ are used to throw the sheaves back to their normal positions, as shown in Fig. 9, after having been thrust aside by the plow or spreader T at either end of the load-carriage H, as shown in Fig. 9. In order that the plow may effect this result, a semicircular buffer $S^{14}$ is attached to the revolving shaft $S^7$ and so projecting that the point or side of the plow will strike against it. (See dotted lines, Fig. 10.) The hauling-cables are supported by the fixed sheaves of carrier, and the grapple-operating cables are supported by the movable sheaves. As the load-carriage travels along the boom-frame these movable sheaves are thrust laterally to allow the carriage to pass to and fro upon it.

The drawings illustrate two distinct hoisting-machines as being mounted on the main or turn-table platform at diametrically-opposite points, a distinct machine being provided for operating the load-carriage and grapple on each projection of the boom or cantaliver frame. Each of these said hoisting-machines includes, in addition to the main drums M and M' and bull-wheels W, a main driving-shaft N, on which is mounted a pair of bevel gear-wheels N', having suitable clutch provision to permit them to be independently actuated. The wheels N' are in mesh with a corresponding wheel $N^2$ on the end of a longitudinally-located shaft $N^3$, provided at its rear with a worm $N^4$, in mesh with a worm-wheel O on the upper end of a vertical shaft O', extending down through the main platform and carrying a pinion $O^2$, engaging the teeth of the gear-ring C.

The bull-wheel W is provided with pawls and ratchets and is controlled by a friction-clutch $W^3$, placed on standard $W^4$. The clutch, pawls, and ratchet-teeth permit the wheel to be held fast in position when the bucket or other load is being operated.

From the description of the apparatus thus far furnished it will be readily understood that the operation of the hoisting-machine proper is completely under the control of the attendant, who preferably occupies an elevated position to clearly follow the several steps incident to the operation of the apparatus. The drum M is first caused to rotate to wind the cable J' for closing the grapple or bucket, after which the drum M' is caused to rotate in unison, thus exerting an equal traction on both chains or cables J and J' and effecting the elevation of the closed bucket or grapple. When this has been accomplished, the bull-wheel or spool W is simultaneously revolved, so as to wind in one portion of the hauling-cable K', and if two are used to pay out the other, with the result that the load-carriage, with its suspended closed grapple or bucket, travels inward or outward along the track or trolley-way, as may be desired. During this operation the shaft $N^3$ is actuated to rotate the turn-table, and thereby swing the entire boom or cantaliver frame in either direction to any needed extent. An independent engine may, however, be employed for swinging the machine.

It is important that the winding-speeds of drum M M' and bull-wheel or spool W be such that the several cables will travel with equal rapidity and that enough sheaves and fall-rope carriers are provided to prevent any undue sagging or slackness of the cables of the load-carriage.

The arrangement of friction-clutches, ratchets, and pawls of the bull-wheel or spool is such that the load-carriage can be positively held at any point along the track or trolley-way to permit the descent and discharge of the grapple or bucket thereat. I attach importance to the fact that my improved hoisting and conveying apparatus permits the filled bucket or grapple to be lowered to any desired extent before discharging, thus preventing damage that might otherwise occur.

Instead of being strictly horizontal the track or trolley-way may either or both be inclined, so that the load carriage or carriages can be moved in one direction by gravity.

The provision of the boom shaft and wheel for turning the main platform is quite efficient in that it serves as a brake or lock to positively hold said platform in any position to which it may be turned.

The turn-table operation may be effected by either or both of the hoisters or by an independent swinging engine. When only one load-carriage and grapple is present and operated, the boom or cantaliver frame can be efficiently counterbalanced by a weight suitably suspended from the other arm or trolley-way and which may then be of any reduced length.

While I have illustrated a grapple or bucket unloading the contents of a scow or barge and delivering same to a railroad-car, in some instances it will be practical to provide the cars internally with platform sections or cages capable of being lifted out to dump the coal or other material carried thereby.

These single-truss cantaliver trolley-ways are light, rigidly braced, and always balanced irrespective of the positions of the buckets or other loads. The carrying capacity of this cantaliver can be doubled by placing and connecting a similar truss alongside of the first. It is equally well suited for handling blocks of stone, pipe, heavy castings as for dredging, placer-mining, and for loading, unloading, and conveying operations generally.

What I claim is—

1. In hoisting and conveying apparatus, the combination with a rotatable supporting-frame, of a boom or truss frame supported thereon and consisting of a single upper and lower member located in vertical alinement and connected together by uprights, a track upon the lower member, a traveling carriage upon said track, and mechanism for operating said carriage and parts supported thereby.

2. In hoisting and conveying apparatus, the combination with a rotatable supporting-frame, of a boom or truss frame supported thereon, and consisting of a single upper and lower member located in vertical alinement and connected together by uprights, lateral braces extending from said upper member to said supporting-frame, a track upon the lower member, a traveling carriage upon said lower member, and mechanism for operating said carriage and parts supported thereby.

3. In hoisting and conveying apparatus the combination with a rotatable supporting-frame, of a boom or truss frame supported thereon and consisting of a single upper and lower member located in vertical alinement and connected together by uprights, said upper member being inclined, and a plurality of lateral braces connected with said upper member at different points in its length and extending from opposite sides of the same and situated one above the other and connected with said supporting-frame, a track upon the lower member, a traveling carriage upon said track, and mechanism for operating said carriage and parts supported thereby.

4. In hoisting and conveying apparatus, the combination with a rotatable supporting-frame, of a boom or truss frame supported thereon and consisting of a single upper and lower member located in vertical alinement and connected together by uprights, longitudinally-adjustable lateral braces, a track upon the lower member, a traveling carriage upon said track and mechanism for operating said carriage and parts supported thereby.

5. In hoisting and conveying apparatus, the combination with a rotatable supporting-frame, said frame having uprights suitably connected together, cross-stays extending between the upper ends of the end uprights, and truss-supports extending between said end uprights, and below said cross-stays, of a boom or truss frame consisting of a single upper and lower member connected together by uprights, the upper member being supported by said cross-stays and the lower member by said truss-supports, a track upon said lower member, a traveling carriage upon said track, and mechanism for operating said carriage and parts supported thereby.

6. In hoisting and conveying apparatus, the combination with a rotatable supporting-frame, said frame having uprights suitably connected together, cross-stays extending between the upper ends of the end uprights and truss-supports extending between said end uprights and below said cross-stays, of a boom or arm consisting of a single upper and lower member connected together by uprights, the upper member being supported by said cross-stays and the lower member by said truss-supports, lateral braces extending from opposite sides of said upper member to said end uprights, a track upon said lower member, a traveling carriage upon said track, and mechanism for operating said carriage and parts supported thereby.

7. In hoisting and conveying apparatus, the combination with a rotatable supporting-frame, said frame having uprights suitably connected together, cross-stays extending between the upper ends of the end uprights and truss-supports situated below said cross-stays, of a boom or truss frame consisting of a single upper and lower member connected together by uprights, the upper member being supported by said cross-stays and the lower member by said truss-supports, a plurality of lateral braces connected with said upper member at different points in its length and extending from opposite sides of the same and situated one above the other and connected with said uprights, a track upon the lower member, a traveling carriage upon said track, and mechanism for operating said carriage and parts supported thereby.

8. In hoisting and conveying apparatus, the combination with a rotatable supporting-frame, of a boom or truss frame supported thereon and consisting of a single upper and lower member, said lower member comprising two parallel beams, uprights connected with said upper member, and having their lower ends situated between and connected with the beams of the lower member, a track upon said lower member, a carriage traveling thereon, and mechanism for operating said carriage and parts supported thereby.

9. In hoisting and conveying apparatus, the combination with a rotatable supporting-frame, of a boom or truss frame supported thereon and consisting of a single lower and upper member located in vertical alinement and connected together by uprights, oppositely-extending lateral flanges on said lower member forming a track, a carriage traveling upon said track, and mechanism for operating said carriage and parts carried thereby.

10. In hoisting and conveying apparatus, the combination with a base, a turn-table structure mounted thereon, gearing between said turn-table structure and base for turning the former, a pair of hoisting-machines upon said turn-table structure, independently and conjointly operative, each of said hoisting-machines operating gearing for revolving said turn-table, of a boom or truss frame mounted upon said turn-table structure and having oppositely-extending tracks and carriages traveling upon said tracks, said carriages and parts supported thereby being operated by said hoisting-machines.

11. The combination with a boom or arm having a track, a traveling carriage, and cables for operating said carriages and parts supported thereby, of oppositely-extending bracket-arms secured to said boom or arm and provided with fixed and movable sheaves for supporting said cables.

12. The combination with a boom or arm having a track, a traveling carriage, and cables for operating said carriage and parts supported thereby, of oppositely-extending bracket-arms secured to said boom or arm and provided with fixed and movable sheaves for supporting said cables, said movable sheaves being situated below said boom or arm.

13. The combination with a boom or arm having a track, a traveling carriage, and cables for operating said carriage and parts supported thereby, of oppositely-extending bracket-arms secured to said boom or arm and provided with fixed sheaves situated laterally with respect to said boom or arm, and with movable sheaves situated below said boom or arm.

14. The combination with a boom or arm having a track, a traveling carriage, and cables for operating said carriage and parts supported thereby, of oppositely-extending bracket-arms secured to said boom or arm and provided with fixed sheaves situated laterally with respect to said boom or arm, and with movable sheaves situated below said boom or arm, said movable sheaves being carried by an axle extending at an angle from an upright rotatable shaft mounted upon one of said bracket-arms.

15. The combination with a boom or arm having a track, a traveling carriage, and cables for operating said carriage and parts supported thereby, of oppositely-extending bracket-arms secured to said boom or arm and provided with fixed sheaves situated laterally with respect to said boom or arm, and with movable sheaves situated below said boom or arm, said movable sheaves being carried by an axle extending at an angle from an upright rotatable shaft mounted upon one of said bracket-arms, and a spring acting upon said shaft for normally holding said movable sheaves transversely with respect to said boom or arm.

16. The combination with a boom or arm having a track, a traveling carriage, and cables for operating said carriage and parts supported thereby, of oppositely-extending bracket-arms secured to said boom or arm and provided with fixed and movable sheaves for supporting said cables, said movable sheaves being provided with a buffer on opposite sides thereof.

17. The combination with a boom or arm having a track, a traveling carriage upon said track having a spreader or plow tapered at its ends, cables for operating said carriage and parts supported thereby, of oppositely-extending bracket-arms secured to said boom or arm and provided with fixed and movable sheaves for supporting said cables, said movable sheaves being normally situated in the path of said spreader or plow, and means for yieldingly holding said movable sheaves in said position.

18. The combination with a boom or arm having a track, a traveling carriage upon said track having a spreader or plow tapered at its ends, cables for operating said carriage and parts supported thereby, of oppositely-extending bracket-arms secured to said beam or arms and provided with fixed and movable sheaves for supporting said cables, said movable sheaves being provided on opposite sides thereof with buffers situated in the path of said spreader or plow and with means for yieldingly holding the same in said position.

19. In hoisting and conveying apparatus, the combination with a rotatable supporting-frame having a boom or truss frame, said boom or truss frame consisting of a single upper and lower member located in vertical alinement and connected together by uprights, of oppositely-extending bracket-arms secured to said uprights and provided with fixed and movable sheaves, a track upon the lower member, a traveling carriage upon said track, and cables for operating said carriage and parts supported thereby, said cables being supported by said fixed and movable sheaves.

20. In a hoisting and conveying apparatus, the combination with a turn-table structure supporting a boom or cantaliver frame formed of a single truss, the corner uprights of the structure extending above the cross-bearings carrying the said boom or cantaliver frame together with cross-braces for the latter connected with uprights, said boom or frame having a trolley-way along which moves the load-carriage suspending the grapple or its equivalent, and a hoisting-machine for operating said carriage and buckets, substantially as set forth.

21. In a hoisting and conveying apparatus, the combination with a turn-table structure, a boom or frame supported thereon and comprising the upper horizontally-extended bar $G^2$, stays depending therefrom and secured between angle-irons forming a track or trolley way, lateral braces for said boom or cantaliver frame and a load-carriage and grapple or its equivalent movable along said track, and operating means for the carriage and grapple, substantially as set forth.

22. In a hoisting and conveying apparatus, the combination with a turn-table structure, of a boom or cantaliver frame supported thereon and comprising the upper horizontally-extended bar $G^2$, having the outer inclined portions, stays depending from said bar and secured between angle-irons forming a track or trolley way, and adjustable braces $G^7$, connected to the corner-uprights of said structure and to the projecting portions of the boom or trolley-way at different points in its length, together with a load-carriage and grapple or its equivalent and operating mechanism, substantially as set forth.

23. In a hoisting and conveying apparatus the combination with a central turn-table-structure carriage, a pair of hoisting-machines adapted for independent and joint operation and each actuating a turn-table gear-wheel, together with a boom, a cantaliver-frame having oppositely-extending tracks or trolley-way, and load-carriages and grapples or their equivalent operated by said hoisting-machines, substantially as set forth.

24. In a hoisting and conveying apparatus and in combination therewith the fall-rope carrier S, consisting of two bracket-arms secured to the vertical brace $G^3$, said brackets supporting fixed and movable sheaves respectively as described, and said movable sheaves provided with a semicircular buffer, attached, substantially as described and for the purpose set forth.

25. In hoisting and conveying apparatus, the combination with a rotatable supporting-frame, of a boom or truss frame supported thereon and extending on opposite sides thereof and consisting of a single upper and lower member suitably connected, lateral braces extending between said upper member and the said supporting-frame, a track upon said lower member, a traveling carriage upon said track, and mechanism for operating said carriage and parts supported thereby.

26. In hoisting and conveying apparatus, the combination with a rotatable supporting-frame, of a boom or truss frame supported thereon and extending on opposite sides thereof and consisting of upper and lower members mounted upon cross-pieces of said frame, longitudinally - adjustable lateral braces extending between the upper member of said supporting-frame, a track upon the lower member, a traveling carriage upon said track, and mechanism for operating said carriage and parts supported thereby.

27. In hoisting and conveying apparatus, the combination with the supporting-frame, of a boom or truss frame mounted thereon and consisting of a single upper and lower member situated in vertical alinement and suitably connected together, said upper member being inclined, and a plurality of lateral braces connected with said upper member at different points in its length and extending from opposite sides of the same and situated one above the other and connected with said supporting-frame, a track upon said lower member, a traveling carriage upon said track, and mechanism for operating said carriage and parts supported thereby.

28. The combination with a boom or arm having a track, a traveling carriage, and cables for operating said carriage, of fixed and movable sheaves for supporting said cables, said movable sheaves being situated below said track.

29. The combination with a boom or arm having a track, a traveling carriage, and cables for operating said carriage, of fixed sheaves situated laterally with respect to said boom or arm, and movable sheaves situated below said boom or arm, said fixed and movable sheaves being adapted to support said cables.

30. The combination with a boom or arm having a track, a traveling carriage, provided with spreader or plow, and cables for operating said carriage, of fixed and movable sheaves for supporting said cable, said movable sheaves being situated in the path of said spreader or plow.

31. The combination with a boom or arm having a track, a traveling carriage, and cables for operating said carriage, of fixed sheaves situated laterally with respect to said boom or arm, and movable sheaves situated below said boom or arm and carried by an axle extending at an angle from an upright rotatable shaft mounted upon said boom or arm, said fixed and movable sheaves being adapted to support said cables.

32. The combination with a boom or arm having a track, a traveling carriage, and cables for operating said carriage, of fixed sheaves situated laterally with respect to said boom or arm, movable sheaves situated below said boom or arm, and means for normally holding said movable sheaves yieldingly beneath the boom or arm, said fixed and movable sheaves being adapted to support said cables.

33. The combination with a boom or arm having a track, a traveling carriage, and cables for operating said carriage, of fixed sheaves situated laterally with respect to said boom or arm, movable sheaves situated below said boom or arm and carried by an axle extending at an angle from an upright rotatable shaft mounted upon said boom or arm, and a spring acting upon said shaft for normally holding the movable sheave yieldingly beneath and transversely with respect to said boom or arm, said fixed and movable sheaves being adapted to support said cables.

34. The combination with a boom or arm having a track, a traveling carriage, and cables for operating said carriage, of fixed sheaves situated laterally with respect to said boom or arm, and movable sheaves situated below said boom or arm and provided with a buffer on opposite sides thereof and in the path of said carriage, said fixed and movable sheaves being adapted to support said cables.

35. The combination with a boom or arm having a track, a traveling carriage, having an oppositely-extending spreader or plow, cables for operating said carriage, of fixed sheaves situated laterally with respect to said boom or arm, and movable sheaves situated normally in the path of said spreader or plow and provided with buffers on opposite sides thereof, said fixed and movable sheaves being adapted to support said cables.

36. The combination with a boom or arm having a track, a traveling carriage having a spreader or plow extending on opposite sides thereof, cables for operating said carriage, of fixed sheaves situated laterally with respect to said boom or arm, movable sheaves situated below said boom or arm and provided on opposite sides thereof with buffers situated in the path of said spreader or plow and means for normally holding said buffers in said position, said fixed and movable sheaves being adapted to support said cables.

Signed at New York, in the county of New York and State of New York, this 25th day of May, 1897.

JAMES H. LANCASTER.

Witnesses:
N. NEUMAYER,
Z. P. BRODIN.